(12) United States Patent
Kuiper et al.

(10) Patent No.: US 7,593,103 B2
(45) Date of Patent: Sep. 22, 2009

(54) LIGHT INTENSITY MEASURING METHOD AND ELECTRONIC DEVICE

(75) Inventors: Stein Kuiper, Vught (NL); Bernardus H. W. Hendriks, Eindhoven (NL); Robert W. J. Zijlstra, Kenley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 300 days.

(21) Appl. No.: 11/719,217

(22) PCT Filed: Nov. 7, 2005

(86) PCT No.: PCT/IB2005/053639

§ 371 (c)(1),
(2), (4) Date: May 14, 2007

(87) PCT Pub. No.: WO2006/054195

PCT Pub. Date: May 26, 2006

(65) Prior Publication Data

US 2009/0135423 A1    May 28, 2009

(30) Foreign Application Priority Data

Nov. 18, 2004    (GB)   ................. 0425399.3

(51) Int. Cl.
*G01B 11/00*    (2006.01)
*G01J 1/42*    (2006.01)

(52) U.S. Cl. ...................................... 356/394; 356/218

(58) Field of Classification Search ......... 356/388–394, 356/218–232

See application file for complete search history.

(56) References Cited

U.S. PATENT DOCUMENTS 4,882,598 A * 11/1989 Wulf ................... 250/338.1

(Continued)

FOREIGN PATENT DOCUMENTS

CN        1440178        9/2003

(Continued)

OTHER PUBLICATIONS

Roques-Carmes Thibault et al; "Liquid Behavior", Journal of Applied Physics, American Institute of Physics, vol. 95, No. 8, pp. 4389-4396, 2004, XP012067801.

*Primary Examiner*—Michael P Stafira

(57) ABSTRACT

The present invention discloses a method for measuring an intensity of a part of an electromagnetic spectral range, and an electronic device implementing the method. The method comprises the steps of providing an electronic device comprising an optical device (10) comprising at least a first liquid (A) and being placed in front of a sensor (120), the optical device (10) having a transmittance of the part of the electromagnetic spectral range depending on an orientation of at least the first liquid (A); measuring a first intensity of the electromagnetic (EM) spectral range; changing the orientation of at least the first liquid (A); measuring a second intensity of the electromagnetic spectral range; and calculating an intensity of the part of the electromagnetic spectral range from the difference between the first intensity and the second intensity. Consequently, an intensity for a part of the EM spectral range can be measured without the need for a sensor dedicated to this part of the EM spectral range. In particular, an optical element based on the electrowetting principle is used in a mobile phone to measure the intensity of UV radiation.

15 Claims, 2 Drawing Sheets

U.S. PATENT DOCUMENTS

Figure 1A:
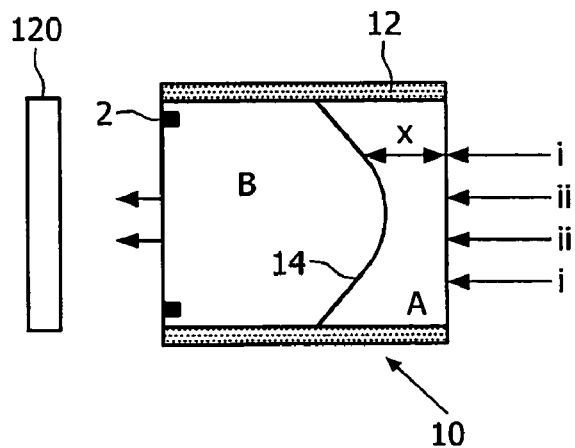

| | | | | |
|---|---|---|---|---|
| 5,781,332 | A | * | 7/1998 | Ogata .................. 359/308 |
| 6,947,630 | B2 | * | 9/2005 | Kai et al. .................. 385/24 |
| 2001/0017985 | A1 | | 8/2001 | Tsuboi et al. |

FOREIGN PATENT DOCUMENTS

| | | |
|---|---|---|
| DE | 10120697 | 11/2002 |
| EP | 1400834 | 3/2004 |
| JP | 60063430 | 4/1985 |
| JP | 2003046112 | 2/2003 |
| WO | 03069380 | 8/2003 |
| WO | 2004038480 | 5/2004 |
| WO | 2004077126 | 9/2004 |
| WO | 2004027489 | 12/2004 |
| WO | 2005003842 A1 | 1/2005 |
| WO | 2005003843 A1 | 1/2005 |

* cited by examiner

LIGHT INTENSITY MEASURING METHOD AND ELECTRONIC DEVICE

The present invention relates to a method for measuring an intensity of a part of an electromagnetic (EM) spectral range.

The present invention further relates to an electronic device for measuring an intensity of a part of an electromagnetic (EM) spectral range.

Technological advances such as the miniaturization of components facilitate the integration of new functionality in electronic devices such as mobile phones. An example of such new functionality is disclosed in Chinese patent application CN-14400178, which discloses a mobile phone having an ultraviolet (UV) radiation measuring function to enable warning the mobile user for overexposure to the UV radiation. To realize this functionality, a UV sensor with an associated processor is added to the mobile phone. Such a UV sensor may be a photodetector as disclosed in Japanese patent application JP2003-046112, in which a UV photodetector is combined with a visible light photodetector.

These solutions are not ideal, because additional hardware dedicated to measuring the intensity of the part of the EM spectrum of interest, i.e. UV radiation, is required, thus adding to the cost of the electronic device. It is noted that sensors that are sensitive to both the UV and visible part of the electronic spectrum are well-known; however, the light intensity measured by these sensors is the combined intensity of both the UV and the visible part of the electromagnetic spectrum, which prohibits the determination of the intensity of one of these components in isolation.

The present invention seeks to provide a method according to the opening paragraph that does not require a dedicated sensor.

The present invention further seeks to provide an electronic device according to the opening paragraph that does not require a dedicated sensor.

According to a first aspect of the invention, there is provided a method for measuring an intensity of a part of an electromagnetic (EM) spectral range, the method comprising providing an electronic device comprising an optical device comprising at least a first liquid and being placed in front of a sensor, the optical device having a transmittance of the part of the electromagnetic spectral range depending on an orientation of at least the first liquid; measuring a first intensity of the electromagnetic spectral range; changing the orientation of at least the first liquid; measuring a second intensity of the electromagnetic spectral range; and calculating an intensity of the part of the electromagnetic spectral range from the difference between the first intensity and the second intensity.

The method of the present invention takes advantage of the fact that liquid based optical devices are becoming increasingly popular for use in electronic device such as mobile phones, because they are cheap to manufacture and comprise no mechanically moving parts. Examples of such optical elements are a variable focus lens as disclosed in PCT patent application WO03/069380, an optical device operating as a diaphragm or shutter as disclosed in US patent application US2001/0017985 or in PCT patent application WO2004/027489 and a zoom lens disclosed in PCT application WO2004/038480 or in PCT application WO2004/077126. A common characteristic of these devices is that the orientation of a liquid is changed by altering the position of the interface between the two liquids to tune the optical function of the optical device. Such a positional change may be a translation, a shape change or a combination of a translation and a shape change. The positional change causes a change in the liquid composition in the light path. The present invention is based on the realization that this change in liquid composition can be used to measure an intensity of a part of the full EM spectral width captured by the sensor behind the optical device. To this end, the first liquid and the second liquid are chosen such that they have a different transmissivity in the part of interest of the EM spectral range to which the sensor is sensitive. This can be achieved by carefully choosing the liquids, or by dissolving in one of the liquids a chromophore having an absorption in the part of interest of said EM spectral range. By measuring the intensity of the spectral range at different liquid compositions in the light path, a variation in the intensity as a function of the different transmissivity in the part of interest of the EM spectral range is obtained without the need for a sensor dedicated to this part of the electromagnetic spectrum.

However, the method of the present invention is not restricted to the use of an optical device comprising a two-liquid system or a liquid-fluid system; other optical devices can be thought of, such as a liquid crystal (LC) based optical device including a chromophore having an absorption in the part of the EM spectral range. Switching the LC material from a first orientation to a second orientation will cause a change in the absorbance of the part of the EM spectrum because the transition dipole of the chromophore will adopt a different orientation to the incoming light. For such an optical device, it is advantageous that the light is polarized prior to entry.

Advantageously, the method further comprises comparing the calculated intensity of the part of the electromagnetic spectral range with a predefined threshold of the intensity; and generating a signal if the calculated intensity exceeds the threshold. This way, a user of the electronic device can be notified if the light intensity in the part of the EM spectral range, e.g. an UV intensity, is too high to be exposed to.

The method of the present invention may be implemented by an electronic device according to another aspect of the present invention, the electronic device having means for measuring an intensity of a part of an EM spectral range, said means comprising a sensor for measuring an intensity of an EM spectral range; an optical device comprising at least a first liquid and being placed in front of the sensor, the optical device having a transmittance of the part of the electromagnetic spectral range depending on an orientation of at least the first liquid; means for changing the orientation of at least the first liquid; and processing means coupled between the sensor and the driver circuitry for calculating an intensity of the part of the electromagnetic spectral range from the difference between a first intensity of the electromagnetic spectral range in a first orientation of the at least first liquid and a second intensity of the electromagnetic spectral range in a second orientation of the at least first liquid.

In a preferred embodiment, the liquid based optical device comprises a container enclosing the first liquid and an electrically susceptible second liquid, said liquids being immiscible and being in contact with each other via an interface, at least one of said liquids being at least partially placed in a light path through the container, the first liquid and the second liquid having a different transmissivity for the part of the electromagnetic spectral range. Such optical devices, which are typically based on electrowetting principles, are likely to become standard functionality in electronic devices including optical functionality, in which case no additional parts need to be added to implement the present invention in such an electronic device.

Alternatively, the first liquid comprises a liquid crystal material including a chromophore having an absorption in a part of the electromagnetic spectral range. The liquid crystal material and the chromophore may be a guest host system.

Advantageously, the electronic device further comprises an output device having a sensory detectable output; the processing means being configured to output a signal relating to the calculated intensity to the output device. By including an output device having a sensory detectable output, i.e. an output that can be picked up by one of the human senses such as sight or hearing, the user of the electronic device can be informed about the measured intensity. For example, the output device may be a display, a speaker or a light emitting diode.

Preferably, the processing means are configured to compare the calculated intensity with a predefined threshold of the intensity, the signal indicating the calculated intensity exceeding the predefined threshold. This way, a user can be warned if the threshold is exceeded, which is desirable for instance to prevent overexposure to the part of the EM spectral range, e.g. the UV part of the EM spectral range.

In an embodiment, the output device comprises an alarm responsive to the processing means, the processing means being configured to activate the alarm after a predetermined time period, said time period being a function of the calculated intensity. Typically, the allowable exposure time to the part of the EM spectral range depends on the intensity of this part. The inclusion of the alarm allows for a user to be informed that the allowable exposure time has expired.

Advantageously, the time period is a function of the calculated intensity and a user defined parameter. Such a parameter may be skin type or skin condition, which allows for a more individualized determination of the time period.

Figure 1B:
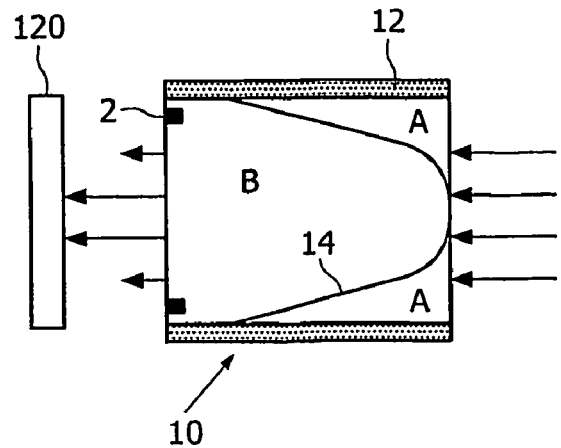
Figure 2A:
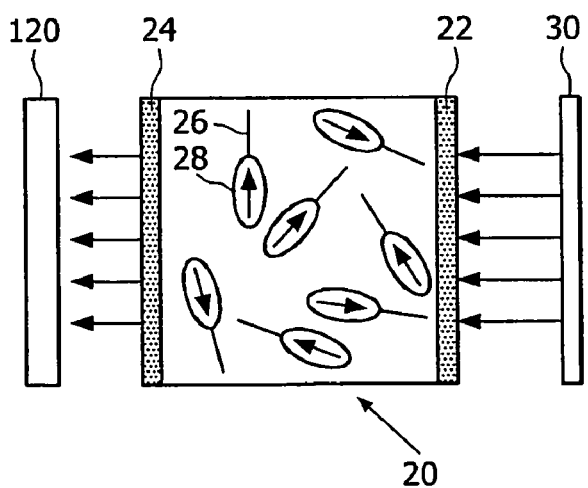
Figure 2B:
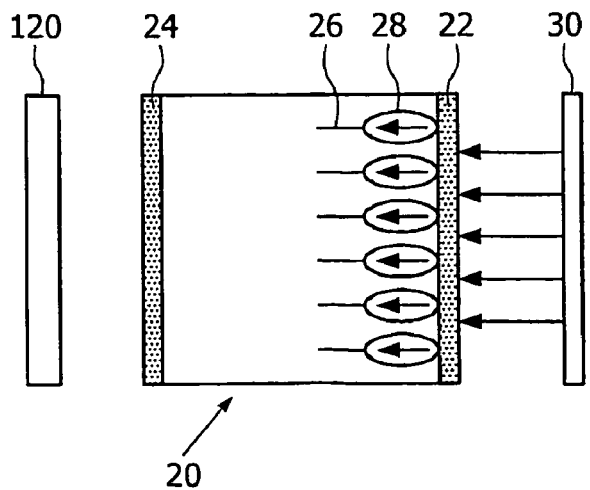
Figure 3:
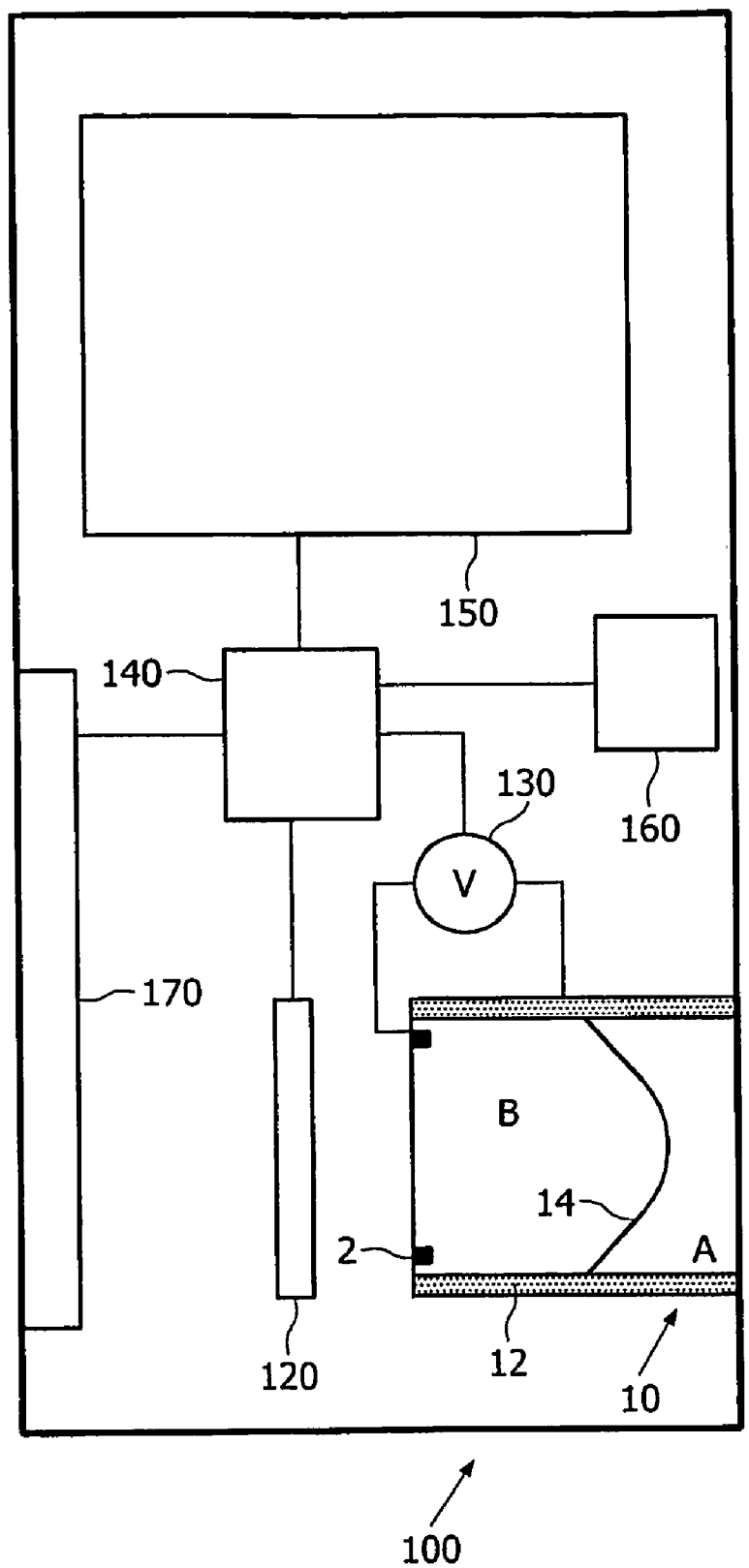

The invention is described in more detail and by way of non-limiting examples with reference to the accompanying drawings, wherein:

FIG. 1 depicts the principle of measuring an intensity of a part of the EM spectrum using a liquid based optical device; and FIG. 2 depicts the principle of measuring an intensity of a part of the EM spectrum using another liquid based optical device; and FIG. 3 depicts an electronic device according to the present invention.

It should be understood that the Figures are merely schematic and are not drawn to scale. It should also be understood that the same reference numerals are used throughout the Figures to indicate the same or similar parts.

FIG. 1 shows an optical device 10 placed in front of an image sensor 120. The image sensor 120 is sensitive to a spectral range of the EM spectrum, for instance a 250 nm-1000 nm spectral range, such as the TH7813A image sensor from the Atmel company. Many other examples are easily accessible. The optical device 10 includes a first liquid A and a second, electrically susceptible, liquid B housed in a cylindrical chamber. The liquids are immiscible and separated by an interface 14, and preferably have the same density to avoid orientation-dependent gravitational effects on the orientation of the liquids including the interface 14 between the liquids. The inner walls of the cylindrical chamber may be covered by a hydrophobic coating such as AF1600™ from the DuPont company, which may be combined with for instance a parylene stack to create an insulating dielectric layer between a wall electrode 12 and the liquids A and B. The wall electrode 12 and an annular electrode 2 are coupled to driver circuitry (not shown) configured to change the position of the first liquid and the second liquid if instructed to do so.

To facilitate the method of the present invention, the first liquid A and the second liquid B have a different transmittance for a part of an EM spectral range to which the image sensor 120 is sensitive. This part of the EM spectrum may for instance be 300-400 nm, i.e. the near-UV part of the EM spectrum. The difference in transmittance may be an intrinsic characteristic of the liquids; for instance, the first liquid A may be an aromatic oil, which typically has a strong absorption band in this part of the EM spectrum, while the second liquid B may be water, which has a substantially weaker absorption in this part of the spectrum. Alternatively, a chromophore such as a dye having a strong absorption in the part of the EM spectrum of interest may be dissolved in one of the two liquids.

The intensity of the part of the EM spectrum of interest is determined in the following way. A first intensity of the electromagnetic spectral range is measured with the image sensor 120 with the liquids A, B in a first orientation, e.g. an orientation as shown in (A). In this example, second liquid B has no significant absorption in the part of interest of the EM spectrum, while first liquid B has a substantial absorption with absorption coefficient k in this part of the EM spectrum. The intensity of the outgoing light (I) compared to intensity ($I_0$) of the incident light can be expressed according to Lambert's law:

$$I=I_0 e^{-kx}$$

with k being the absorption coefficient and x being the distance traveled through the first liquid. If x is long enough, the intensity I will effectively become 0. This is the case for the light having a wavelength in the part of the EM spectrum of interest entering the optical device 10, as indicated by the incoming arrows, at position i. The light entering the optical device at position ii travels a shorter distance through the first liquid, which means that some of the light in the spectral part of interest will exit the optical device 10, as indicated by the outgoing arrows. The length of the arrows relates to the intensity of the ray of lights. It is pointed out that x is a distribution function depending on the shape and position of the interface 14. Consequently, x is a function of the voltage applied to the optical device 10. The values of x can for instance be stored in the electronic device by means of a calibration process.

In a next step, the orientation of the liquids A and B is changed by altering the voltage across the wall electrode 12 and the annular electrode 2 of the optical device 10, e.g. to an orientation as shown in (B). The application of the voltage changes the wettability of the coating on the inner wall of the optical device 10, which causes the change in orientation. In a subsequent step, a second intensity of the light passing through the optical device 10 is measured. Due to the fact that first liquid A is now more oriented along the side walls of the optical device 10, most of the optical path through the optical device 10 is now substantially free of first liquid A, and a larger amount of light having a wavelength in the spectral part of interest passes the optical device, as indicated by the incoming and outgoing arrows. Consequently, the image sensor 120 will measure an increased light intensity caused by the increased intensity of light from the aforementioned part of the EM spectrum. Thus, by comparing the measured first intensity with the measured second intensity, an intensity for the spectral part of interest is obtained. The optical path through the optical device 10 may be restricted by means of a stop or by means of a non-transparent annular electrode 2 to move most of the liquid having the absorption in the part of the EM spectral range outside the optical path in one of the intensity measurements, to increase the difference between the measurements.

If the optical device also functions as a lens, the width of the image captured in the first position of the interface 14 will be different to the width of the image captured in the second position of the interface 14, which could interfere with an accurate measurement of the intensity of the spectral part of interest, for instance if a bright object is included in the fringe of the wider angle image. This can be corrected by adjusting the number of pixels of the image sensor 120 that are included in the evaluation of the two intensity measurements, because the exposed area of the image sensor 120 is a function of the width of the image captured by the optical device 10. This way, the additional fringe from the wider angle image can be ignored, thus ensuring that both measurements are based on images having substantially similar widths. Due to the relationship between the position and shape of the interface 14 and the image width, the number of pixels that have to be considered in each measurement can be preprogrammed into the electronic device.

The present invention is not restricted to electronic devices having an optical device utilizing electrowetting principles. FIG. 2 shows another embodiment of an optical device suitable for the method of the present invention. The optical device 20 comprises a liquid crystal material 26 and a chromophore 28, which may be a suitable dye, sandwiched between an electrode pair 22, 24. The chromophore 28 may be bound to, e.g. form a covalent part of, the liquid crystal material 26. Alternatively, the liquid crystals 26 and the chromophore molecules 28 may be discrete entities forming a guest-host system, in which the orientation of the chromophore molecules 28 is governed by the orientation of the liquid crystal material 26. The intensity of the absorption of light of a particular wavelength by a molecule such as chromophore 28 is governed by the overlap between the orientation of the polarization direction of the light and the transition dipole moment of the chromophore 28. This transition dipole moment is indicated as an arrow inside the chromophore 28 in FIG. 2.

In a first orientation (A), the transition dipole moments of the chromophores 28 are randomly distributed over the optical device 20, and the absorption of the incoming light will have no polarization orientation dependence. However, when an appropriate voltage is applied across the optical device 20 by means of the electrode pair 22 and 24, the chromophore 28 will become strongly oriented, and will function as a polarization filter for the part of the EM spectrum of interest, as shown in second orientation (B). The incoming light that has a polarization direction parallel to the orientation of the transition dipole moment of the chomophore 28 will be more effectively absorbed than in orientation (A), while incoming light that has a polarization direction perpendicular to the orientation of the transition dipole moment of the chomophore 28 will be less effectively absorbed.

This effect can be utilized by placing a polarizer 30 in front of the optical device 20 or behind the optical device 20. The latter orientation is not shown. The polarizer 30 may be a switchable polarizer. By linearly polarizing the light that enters or exits the optical device 20 to a parallel or a perpendicular orientation respective to the orientation of the transition dipole moments of the chomophore 28 in orientation (B), the part of interest of the EM spectrum will have a different intensity in the first orientation than in the second orientation, and a value for the overall intensity of this part of the EM spectrum can be extracted analogous to the way described in the detailed description of FIG. 1.

As an alternative, the orientation of the liquid crystal with respect to the polarization direction of the incident light may be altered between two measurements. For instance, a configurable polarizer may be used that can switch from a horizontal to a vertical polarization direction or from an unpolarized to a polarized state. By switching between two such orientations, the orientation of the liquid crystal and the chromophore 28 inside the optical device 20 can remain unaltered with the transition dipoles of the chromophore 28 in an aligned state, the change in orientation of the liquid comprising a change in the orientation with respect to a polarization state of the incident light.

FIG. 3 shows an example of an electronic device 100 of the present invention. The electronic device 100, which may be a mobile phone, for instance, comprises an optical device 10 placed in front of a sensor 120. The sensor 120 is coupled to a processor 140, which is configured to process the output signal of the sensor 120. The processor 140 is coupled to a configurable driver circuit 130 responsive to the processor 140. The driver circuit 130 is arranged to generate an appropriate voltage across the wall electrode 12 and the annular electrode 2 of the optical device 10 to change the orientation of the first liquid A and the second liquid B by shaping the interface 14 between the first liquid A and the second liquid B. The driver circuit 130 may apply the voltage across the electrode pair 2, 12 by means of a direct or an alternating current; this is immaterial to the present invention.

The processor 140 is configured to calculate an intensity of a part of the EM spectral range of the sensor 120 in the following way. For a first orientation of the interface 14, the sensor 120 measures the incoming light and produces a first output signal, which is processed by the processor 140 to calculate a first intensity of the EM spectral range. The processor 140 instructs driver circuit 130 to alter the position of the interface 14, and upon completion of this change in orientation, the sensor 120 measures the incoming light and produces a second output signal, which is processed by the processor 140 to calculate a second intensity of the EM spectral range. The processor 140 determines the difference between the first intensity and the second intensity, and based thereon, calculates an intensity of the part of interest of the EM spectrum, e.g. the UV part of the spectrum.

The processor 140 may be configured to compare this calculated intensity with a predetermined threshold, and may be configured to produce a warning signal if this threshold is exceeded. Optionally, the processor 140 is responsive to a keypad 170, which a user of the electronic device 100 can use to activate the measurement of the intensity of the part of interest of the EM spectral range, and which may further be used to input user-specific parameters such as skin type or skin condition. These parameters can be used to generate an individualized threshold.

As a further option, the electronic device 100 may comprise an output device 150, such as a display, a speaker or a light emitting diode, to facilitate a sensory detectable warning signal or another signal relating to the measured intensity for the user. An audible warning signal has the advantage that the user does not have to monitor the electronic device 100. This is particularly advantageous if the electronic device 100 further comprises an alarm 160 responsive to the processor 140. The processor 140 may be configured to activate the alarm after a predetermined time period, said time period being a function of the calculated intensity. This time period may also be a function of the aforementioned user defined parameter.

It is emphasized that the optical device 10 may be an electrowetting based optical device 10 having a functionality as disclosed in the aforementioned prior art, or may be an electrowetting device solely for the purpose of the intensity measurement of the present invention. Also, although an electrowetting based optical device 10 is shown, other liquid based optical devices such as the liquid crystal based optical device 20 are equally suitable.

It is also emphasized that in the context of the present invention, the phrase 'an electrically susceptible liquid' is intended to include conductive liquids, polar liquids and polarizable liquids, as well as liquids responsive to a magnetic field.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for measuring an intensity of a part of an electromagnetic spectral range, the method comprising:

providing an electronic device comprising an optical device comprising at least a first liquid and being placed in front of a sensor, the optical device having a transmittance of the part of the electromagnetic spectral range depending on an orientation of at least the first liquid;

measuring a first intensity of the electromagnetic spectral range;

changing the orientation of at least the first liquid;

measuring a second intensity of the electromagnetic spectral range; and calculating an intensity of the part of the electromagnetic spectral range from the difference between the first intensity and the second intensity.

2. A method as claimed in claim 1, further comprising:

comparing the calculated intensity of the part of the electromagnetic spectral range with a predefined threshold of the intensity; and generating a signal if the calculated intensity exceeds the threshold.

3. An electronic device having means for measuring an intensity of a part of an electromagnetic spectral range, said means comprising:

a sensor for measuring an intensity of an electromagnetic spectral range;

an optical device comprising at least a first liquid and being placed in front of the sensor, the optical device having a transmittance of the part of the electromagnetic spectral range depending on the orientation of at least the first liquid;

means for changing the orientation of at least the first liquid; and processing means, coupled between the sensor and the driver circuitry, for calculating an intensity of the part of the electromagnetic spectral range from the difference between a first intensity of the electromagnetic spectral range in a first orientation of the at least first liquid and a second intensity of the electromagnetic spectral range in a second orientation of the at least first liquid.

4. An electronic device as claimed in claim 3, wherein the optical device comprises a container enclosing the first liquid (A) and an electrically susceptible second liquid (B), said liquids (A; B) being immiscible and being in contact with each other via an interface (14), at least one of said liquids (A; B) being at least partially placed in a light path through the container, the first liquid (A) and the second liquid (B) having a different transmissivity for the part of the electromagnetic spectral range.

5. An electronic device as claimed in claim 3, wherein the first liquid comprises a liquid crystal material including a chromophore having an absorption in a part of the electromagnetic spectral range.

6. An electronic device as claimed in claim 5, wherein the liquid crystal material including the chromophore comprises a guest host system.

7. An electronic device as claimed in claim 3, further comprising an output device having a sensory detectable output, the processing means being configured to output a signal relating to the calculated intensity to the output device.

8. An electronic device as claimed in claim 7, wherein the processing means are configured to compare the calculated intensity with a predefined threshold of the intensity, the signal indicating the calculated intensity exceeding the predefined threshold.

9. An electronic device as claimed in claim 7, wherein the output device is a display.

10. An electronic device as claimed in claim 7, wherein the output device is a speaker.

11. An electronic device as claimed in claim 7, wherein the output device is a light emitting diode.

12. An electronic device as claimed in claim 7, wherein the output device comprises an alarm responsive to the processing means, the processing means being configured to activate the alarm after a predetermined time period, said time period being a function of the calculated intensity.

13. An electronic device as claimed in claim 12, wherein the time period is a function of the calculated intensity and a user defined parameter.

14. An electronic device as claimed in claim 3, wherein the part of the electromagnetic spectral range comprises at least a part of the ultraviolet part of the electromagnetic spectrum.

15. An electronic device as claimed in claim 4, wherein the difference in transmissivity is at least partially caused by a chromophore having an absorption in a part of the electromagnetic spectral range being dissolved in one of said liquids (A; B).

* * * * *